(12) United States Patent
Karishetti et al.

(10) Patent No.: US 12,276,985 B2
(45) Date of Patent: Apr. 15, 2025

(54) OBSTRUCTION AVOIDANCE (71) Applicant: Zimeno, Inc., Livermore, CA (US)

(72) Inventors: Deepak Rajasekhar Karishetti, Santa Clara, CA (US); Sanket Goyal, Pleasanton, CA (US)

(73) Assignee: Zimeno Inc., Livermore, CA (US)

( * ) Notice: Subject to any disclaimer, the term of this patent is extended or adjusted under 35 U.S.C. 154(b) by 472 days.

(21) Appl. No.: 17/490,001

(22) Filed: Sep. 30, 2021

(65) Prior Publication Data

US 2023/0102940 A1 Mar. 30, 2023

(51) Int. Cl.
*G05D 1/02* (2020.01)
*G05D 1/00* (2024.01)
*G06F 18/23* (2023.01)
*G06F 18/24* (2023.01)
*G06K 9/00* (2022.01)
*G06K 9/62* (2022.01)
*G06V 20/56* (2022.01)

(52) U.S. Cl.
CPC ......... *G05D 1/0223* (2013.01); *G05D 1/0094* (2013.01); *G05D 1/0214* (2013.01); *G06F 18/23* (2023.01); *G06F 18/24* (2023.01); *G06V 20/56* (2022.01)

(58) Field of Classification Search
None
See application file for complete search history.

(56) References Cited

U.S. PATENT DOCUMENTS

| 6,112,139 A * | 8/2000 | Schubert ................. E02F 9/205 701/1 |
| 8,666,550 B2 | 3/2014 | Anderson et al. |
| 10,251,327 B2 * | 4/2019 | Henry .................... A01B 63/14 |
| 10,479,354 B2 | 11/2019 | Posselius et al. |

(Continued)

FOREIGN PATENT DOCUMENTS

| DE | 3230330 | 2/1984 |
| DE | 102017112014 | 12/2017 |

(Continued)

OTHER PUBLICATIONS

Machine translation of WO-2020215608-A1 (Year: 2020).*

(Continued)

*Primary Examiner* — Amelia Vorce
*Assistant Examiner* — Kyle S Park
(74) *Attorney, Agent, or Firm* — Rathe Lindenbaum LLP (57) ABSTRACT An obstruction avoidance system may include a agronomy vehicle, at least one sensor configured to output signals serving as a basis for a three-dimensional (3D) point cloud and to output signals corresponding to a two-dimensional (2D) image, and instructions to direct a processor to capture a particular 2D image and to obtain signals serving as a basis for a particular 3D point cloud; identify an obstruction candidate in the particular 2d image; correlate the obstruction candidate to a portion of the particular 3D point cloud to determine a value for a parameter of the obstruction candidate; classify the obstruction candidate as an obstruction based upon the parameter; and output control signals to alter a state of the agronomy vehicle in response to the obstruction candidate being classified as an obstruction.

16 Claims, 8 Drawing Sheets

(56) References Cited

U.S. PATENT DOCUMENTS

| | | | |
|---|---|---|---|
| 10,874,044 B2 | 12/2020 | Cavender-Bares | |
| 10,925,210 B2 | 2/2021 | Matsuda et al. | |
| 11,181,517 B2 | 11/2021 | McPeek | |
| 11,269,346 B2 | 3/2022 | Madsen et al. | |
| 2011/0153168 A1* | 6/2011 | Peterson | A01B 79/005 701/50 |
| 2013/0030565 A1* | 1/2013 | Zielke | A01B 79/005 700/231 |
| 2014/0313339 A1* | 10/2014 | Diessner | B60R 1/00 348/148 |
| 2015/0324658 A1* | 11/2015 | Zhang | G06F 18/256 382/203 |
| 2016/0356594 A1* | 12/2016 | Sorenson | G08G 1/161 |
| 2017/0357267 A1 | 12/2017 | Foster et al. | |
| 2018/0319396 A1* | 11/2018 | Foster | B60W 30/0956 |
| 2019/0014723 A1 | 1/2019 | Stanhope et al. | |
| 2019/0180467 A1 | 6/2019 | Li et al. | |
| 2019/0308471 A1* | 10/2019 | Fiorati | B62D 49/0621 |
| 2019/0382005 A1* | 12/2019 | Nishi | A01B 69/001 |
| 2020/0100419 A1* | 4/2020 | Stanhope | A01B 19/10 |
| 2021/0024062 A1 | 1/2021 | Schott et al. | |
| 2021/0027498 A1 | 1/2021 | Ferrari et al. | |
| 2021/0043085 A1 | 2/2021 | Kreiling et al. | |
| 2021/0090274 A1* | 3/2021 | Fu | A01M 7/0042 |
| 2022/0330474 A1* | 10/2022 | Pridmore | A01C 7/102 |
| 2023/0221728 A1* | 7/2023 | Iwase | G05D 1/0088 701/50 |

FOREIGN PATENT DOCUMENTS

| | | | |
|---|---|---|---|
| DE | 102018010042 | 7/2019 | |
| DE | 102019201690 | 8/2020 | |
| GB | 2583081 | 10/2020 | |
| WO | WO-2017106478 A1 * | 6/2017 | A01B 69/008 |
| WO | WO2020106143 | 5/2020 | |
| WO | WO-2020215608 A1 * | 10/2020 | A01B 3/26 |
| WO | WO2020262416 | 12/2020 | |

OTHER PUBLICATIONS

PCT Search Report for PCT/US2021052780 mailed on Feb. 3, 2022.

Paigwar Anshul et al. GndNet: Fast Ground Plane Estimation and Point Cloud Segmentation for Automomous Vehicles, IROS 2020, International Conf. on Intelligent Robotics and Systems, Oct. 24, 2020, pp. 2150-2156 doi: 10.1109/IROS45743.2020.9340979, abstract.

* cited by examiner

OBSTRUCTION AVOIDANCE

BACKGROUND

Agronomy vehicles, such as tractors and associated implements, are frequently used to carry out various tasks. As the agronomy vehicles traverse a terrain, obstacles or obstructions may be encountered. Such obstructions may cause damage to the agronomy vehicle, such as an implement being moved by a tractor.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example obstruction avoidance systems, obstruction avoidance methods and obstruction avoidance mediums that identify obstructions (also referred to as obstacles) in the path of an agronomy vehicle and that automatically respond to the upcoming obstruction to avoid or reduce damage to the agronomy vehicle. For purposes of this disclosure, an "agronomy vehicle" may comprise any vehicle that is to traverse a field, vineyard or orchard while interacting with the soil or plants. An agronomy vehicle may comprise a tractor and an associated implement that is pushed, pulled or carried by the tractor. In agronomy vehicle may comprise a self-propelled vehicle that incorporates components for interacting with the soil or plants in a field, vineyard or orchard. Interaction by an agronomy vehicle may involve tillage of the soil, the application of herbicide, insecticide or fertilizer to the soil or to plants, the pruning of plants, the cutting or turning of plants, and/or the harvesting of plants or their produce.

For example, upon encountering an obstruction, the state of an implement being towed by a tractor may be altered to reduce or avoid damage to the implement. The example obstruction avoidance systems, methods and mediums utilize a two-dimensional (2D) image to identify obstruction candidates. An obstruction candidate may be classified as an obstruction depending upon whether the obstruction candidate is expected to be contacted or engaged by the agronomy vehicle. To determine whether an obstruction candidate will be contacted or engaged by the agronomy vehicle, the example obstruction avoidance systems, obstruction avoidance methods and obstruction avoidance mediums utilize a 3D point cloud, corresponding to the 2D image, to determine a value for a parameter of the obstruction candidate. A 3D point cloud refers to a set of data points in space. Example parameters of an obstruction candidate that may be determined from points in a 3D point cloud include, but are not limited to, a location of the obstruction the candidate and dimensions (length, width and/or height) of the obstruction candidate. If the obstruction candidate is classified as an obstruction due to one or more values of one or more parameters of the obstruction candidate, the state of the agronomy vehicle is altered.

In some implementations, the altering of the state of the agronomy vehicle is automatic in response to the presence of an obstruction candidate classified as an obstruction. In some implementations, the altering of the state of the agronomy vehicle is carried out independent of the particular location and/or particular dimensions of the particular obstruction candidate. For example, an agronomy vehicle may be raised to a predefined height in response to the presence of an obstruction, regardless of the actual particular height of the obstruction. Said another way, the agronomy vehicle may be adjusted in the same manner in response to two different obstructions despite the two different obstructions having different locations and/or different heights. In other implementations, the altering of the state of agronomy vehicle may vary depending upon the particular location and/or particular dimensions of the particular obstruction. For example, in agronomy vehicle may be raised to a first agronomy vehicle height in response to the presence of an obstruction having a first obstruction height and may be raised to a second different agronomy vehicle height in response to the presence of an obstruction having a second different obstruction height.

The identification of obstruction candidates in the 2D image may be achieved in several ways. In some implementations, the example obstruction avoidance systems, methods and mediums distinguish between objects that are predetermined or known not to be obstructions and those objects that may be obstructions. For example, crops or weeds which are intended to be engaged by an implement may not be of concern and may not constitute obstructions. Certain plants may be known to be sufficiently flexible so as to not damage and implement even when engaged by the implement. In some implementations, any object in the 2D image that is not identified as a known non-obstruction is identified as an obstruction candidate. The dimensions and/or locations of such identified known non-obstruction objects is not determined or if determined, ignored.

The remaining identified objects (objects not identified as known non-obstruction objects) constitute potential or candidate obstructions depending upon whether such remaining objects are within the path of the tractor and/or implement and depending upon the dimensions of such remaining obstructions. The example obstruction avoidance systems, obstruction avoidance methods and obstruction avoidance mediums correlate the remaining identified objects to corresponding clusters of points in a 3D point cloud corresponding to the 2D image to determine the location and/or dimensions of the remaining objects. Based upon the determined location and/or dimensions of the objects, the object may be classified as an obstruction for which a response may be determined. The example obstruction avoidance systems, methods and mediums alter a state of the implement coupled to the tractor in response to the object or obstruction candidate being classified as an obstruction.

In some implementations, the example obstruction avoidance systems, obstruction avoidance methods and obstruction avoidance mediums identify objects known to be non-obstruction objects. Any other object that cannot be identified as a non-obstruction object is correlated to a cluster of points in the 3D point cloud to determine its location and dimension so as to determine whether or not the object is an obstruction for which a response may be determined. In some implementations, the example obstruction avoidance systems, obstruction avoidance methods and obstruction avoidance mediums identify objects in the 2D image that may constitute an obstruction, wherein those objects identified as obstruction candidates are each correlated to a cluster of points in the 3D point cloud to determine the location and dimension of the obstruction candidate so as to determine whether or not the obstruction candidate is an actual obstruction, whether or not the obstruction candidate will be engaged by the implement given the characteristics of the implement and its current path as well as the location and dimensions of the obstruction candidate.

For example, an object in the 2D image may be identified as a rock. The rock identified in the 2D image is then correlated to a corresponding cluster of points in the 3D point cloud to determine the location and dimension of the rock so as to determine whether or not the rock (a) is located within the path of the tractor/implement and (b) has dimensions that would result in the rock being undesirably engaged by the implement. In some circumstances, the rock may have dimensions that would result in engagement with implement, but the rock is not at a location in the current path of the implement. In some instances, the rock may be within the current path of the implement, but the rock may have dimensions such that the implement may pass over the rock without damage to the implement. In circumstances where the rock is within the path of the tractor/implement and has dimensions that would result in the rock being engaged or contacted by the implement, the rock may be classified as an obstruction, wherein an appropriate response may be determined.

In some implementations, those objects in the 2D image that cannot be identified as either known non-obstructions (plants, weeds and the like) or known/predetermined potential obstructions or known obstruction candidates (rocks and the like), may nevertheless be treated or identified as obstruction candidates, wherein the unidentified objects in the 2D image are likewise correlated to clusters of points in the 3D point cloud to determine their location and dimension and to classify each of such unidentified objects as either (a) an obstruction for which a response may be needed or (b) not an obstruction in that the unidentified object will not be engaged by the implement when the tractor/implement passes by or over the unidentified object.

In some implementations, the example obstruction avoidance systems, obstruction avoidance methods and obstruction avoidance mediums identify obstruction candidates by identifying those objects in the 2D image that sufficiently match or correspond to predetermined or known obstructions, wherein only those objects in the 2D image that sufficiently matter correspond to the predetermined known obstructions are identified as obstruction candidates.

The 2D image and the 3D point cloud are acquired by the tractor. In some implementations, different sensors are utilized to acquire the 2D image and the 3D point cloud. For example, the 2D image may be acquired with the camera while the 3D point cloud may be acquired with a different sensor, such as a LIDAR. In some implementations, the 2D image and the 3D point cloud may be acquired by a stereo camera carried by the tractor.

In some implementations, the example obstruction avoidance systems, methods and mediums utilize a neural network to identify the obstruction candidate based upon criteria learned from a prior set of training images depicting various objects known to be non-obstruction objects and/or known to be obstruction objects. In yet other implementations, the identification of known non-obstruction objects and/or known obstruction objects is carried out using other image analysis.

In implementations where the agronomy vehicle comprises an implement moved by a tractor, the state of the implement being altered in response to the determined location and dimension of an obstruction may refer to the position or location at which the implement is supported or otherwise coupled to the tractor. In some implementations, in response to an obstruction having a determined location within the path of the tractor, the tractor may raise the implement to a height of us to not engage the obstruction and subsequently lower the implement back into operation after the obstruction has been passed by the implement. In some implementations, the tractor may redirect itself such the tractor and/or implement does not engage the obstruction. In some implementations, the change in the state of the implement may refer to a change in an operation of the implement based upon the determined location and/or height of the obstruction. For example, rotating or translating parts of the implement may be repositioned, slowed, sped up or stopped based upon the determined location and/or height of the obstruction.

For purposes of this disclosure, unless explicitly recited to the contrary, the determination of something "based on" or "based upon" certain information or factors means that the determination is made as a result of or using at least such information or factors; it does not necessarily mean that the determination is made solely using such information or factors. For purposes of this disclosure, unless explicitly recited to the contrary, an action or response "based on" or "based upon" certain information or factors means that the action is in response to or as a result of such information or factors; it does not necessarily mean that the action results solely in response to such information or factors.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random-access memory (RAM) for execution by the processing unit from a read only memory (ROM), a mass storage device, or some other persistent storage. In other embodiments, hard wired circuitry may be used in place of or in combination with software instructions to implement the functions described. For example, a controller may be embodied as part of one or more application-specific integrated circuits (ASICs). Unless otherwise specifically noted, the controller is not limited to any specific combination of hardware circuitry and software, nor to any particular source for the instructions executed by the processing unit.

Disclosed is an example obstruction avoidance system that may include an agronomy vehicle, at least one sensor configured to output signals serving as a basis for a three-dimensional (3D) point cloud and to output signals corresponding to a two-dimensional (2D) image, a processor, and a non-transitory computer-readable including instructions to direct the a processor to: output control signals to capture a particular 2D image proximate the agronomy vehicle and to obtain signals serving as a basis for a particular 3D point cloud; identify an obstruction candidate in the particular 2d image; correlate the obstruction candidate in the particular 2D image to a portion of the particular 3D point cloud to determine a value for a parameter of the obstruction candidate; classify the obstruction candidate as an obstruction based upon the value of the parameter; and output control signals to alter a state of the agronomy vehicle in response to the obstruction candidate being classified as an obstruction.

Disclosed is an example obstruction avoidance system. The obstruction avoidance system may include a tractor for use with an implement, at least one sensor configured to output signals serving as a basis for a three-dimensional (3D) point cloud and to output signals corresponding to a two-dimensional (2D) image, a processor, and a non-transitory computer-readable including instructions to direct the processor to: output control signals to capture a particular 2D image proximate the tractor and to obtain signals serving as a basis for a particular 3D point cloud; identify an obstruction candidate in the particular 2d image; correlate the obstruction candidate in the particular 2D image to a portion of the particular 3D point cloud to determine a location of the obstruction candidate relative to the tractor and to determine a dimension of the obstruction candidate; classify the obstruction candidate as an obstruction based upon the location and the dimension; and output control signals to alter a state of an implement coupled to the tractor in response to the obstruction candidate being classified as an obstruction.

Disclosed an example obstruction avoidance method. The method may include acquiring two-dimensional (2D) image of a region proximate a tractor; acquiring a three-dimensional (3D) point cloud of the region proximate the tractor; identifying an obstruction candidate in the 2D image; correlating the obstruction identified in the 2D image to a portion of the 3D point cloud; determining a location of the obstruction candidate relative to the tractor and a dimension of the obstruction candidate based upon the portion of the 3D point cloud correlated to the obstruction identified in the 2D image; classifying the obstruction candidate as an obstruction based upon the location and the dimension; and outputting control signals to alter a state of coupled to the tractor in response to the obstruction candidate being classified as an obstruction.

Disclosed is an example obstruction avoidance non-transitory computer-readable medium. The media may include instructions for directing a processor to carry out obstruction avoidance operations. The instructions may include: (1) 2D image acquisition instructions for acquiring a two-dimensional (2D) image of a region proximate a tractor; (2) 3D point cloud acquisition instructions for acquiring a three-dimensional (3D) point cloud of the region proximate the tractor; (3) obstruction identification instructions for identifying an obstruction in the 2D image; (4) correlation instructions for correlating the obstruction identified in the 2D image to a portion of the 3D point cloud; (5) obstruction parameter acquisition instructions for determining a location of the obstruction relative to the tractor and a dimension of the obstruction based upon the portion of the 3D point cloud correlated to the obstruction identified in the 2D image; and (6) obstruction response instructions for outputting control signals alter a state of coupled to the tractor based upon the determined location and the determined dimension of the obstruction.

Figure 1:
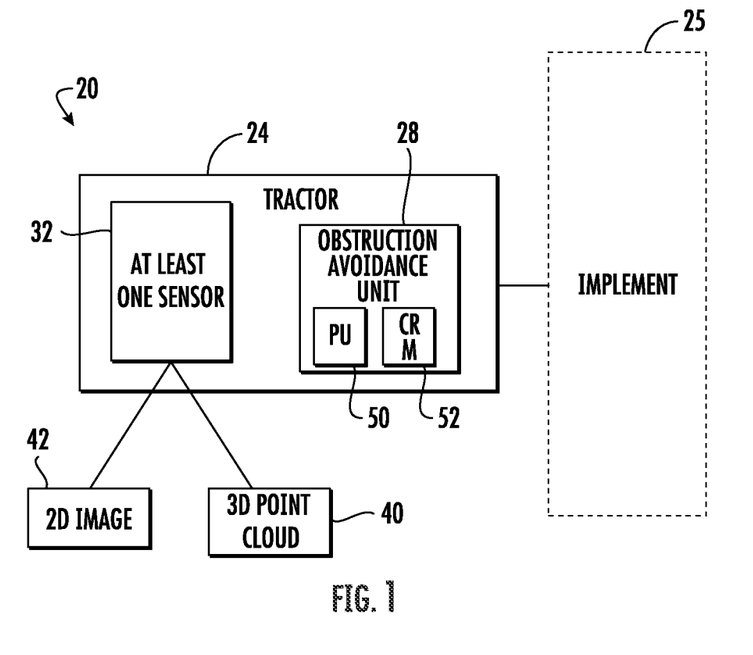
FIG. 1 is a diagram schematically illustrated portions of an example obstruction avoidance system.

FIG. 1 schematically illustrates portions of an example obstruction avoidance system 20. Obstruction avoidance system 20 identifies obstructions in the path of an agronomy vehicle, such as a tractor and/or an implement being pushed, pulled or carried by the tractor and that automatically respond to the upcoming obstruction to avoid or reduce damage to the tractor and/or implement. Obstruction avoidance system 20 utilizes a two-dimensional (2D) image to identify an obstruction candidate from other objects that may exist within the path of the tractor/implement and correlates a three-dimensional (3D) point cloud corresponding to the 2D image with the obstruction candidate identified in the 2D image to determine a value for at least one parameter of the obstruction candidate, such as a value for a location and/or a dimension of the obstruction candidate. System may further classify the direction candidate as an actual obstruction based upon the value of the at least one parameter. Obstruction avoidance system 20 may alter a state of the implement coupled to the tractor in response to the obstruction candidate being classified as an obstruction in some implementations, a state of the implement may be adjusted or altered based upon the determined location and dimension of the obstruction candidate that has been classified as an obstruction. Obstruction avoidance system 20 comprises tractor 24 and obstruction avoidance unit 28.

Tractor 24 comprises an agronomy vehicle and is configured for use with an implement, such as implement 25. Implement 25 may comprise a floating implement. Implement 25 may be cantilevered or suspended at a rear of tractor 24 by a three-point hitch. In some implementations, implement 25 may be elevated by its own tires, sled or other ground engaging members. In some implementations, implement 25 may be selectively raised and lowered using an actuator of tractor 24. In some implementations, what 25 may carry its own actuator to raise and lower itself in response to control signals received from tractor 24. Examples of implement 25 include, but are not limited to, implements having cutter bars such as a hay bine, chopper or the like, tillage implements having shovels or blades that intersects the ground, or other implements that engage the ground or extending close proximity to the surface of the ground.

Tractor 24 comprises at least one sensor 32. The at least one sensor 32 is configured (a) to output signals serving as a basis for a 3D point cloud 40, and (B) to output signals corresponding to a 2D image 42. In some implementations, the at least one sensor 32 comprises a stereo camera having two or more lenses with a separate image sensor or film frame for each lens. The stereo camera output signals for both the 2D image and the 3D point cloud. Some implementations, the three-dimensional images captured by the stereo camera may be transformed into the 3D point cloud with photogrammetry software. In some implementations, a two-dimensional camera may be used for the 2D image and other sensors, such as a LIDAR sensor may be used for the 3D point cloud.

Obstruction avoidance unit 28 automatically alters the state of implement 25 based upon oncoming obstructions, obstructions in the current path of tractor 24 as tractor 24 moves through a field, orchard or vineyard. Obstruction avoidance unit 28 comprises processing unit 50 and a non-transitory computer-readable medium 52. Processing unit 50 follows instructions contained in medium 52.

Figure 2:
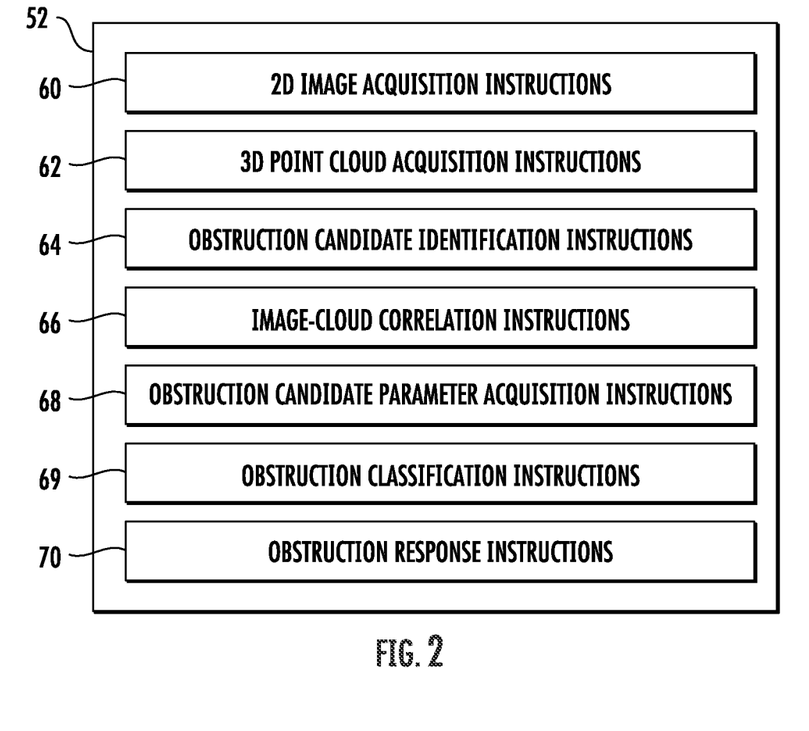
FIG. 2 is a diagram illustrating portions of an example non-transitory computer-readable medium of the example system of FIG. 1.

Non-transitory computer-readable medium 52 comprises a persistent storage device storing recorded instructions for processing unit 30. Examples of medium 52 include, but are not limited to, solid-state memory (flash memory), disk memory and the like. As shown by FIG. 2, medium 52 comprises 2D image acquisition instructions 60, 3D point cloud acquisition instructions 62, obstruction candidate identification instructions 64, image-cloud correlation instructions 66, obstruction candidate parameter acquisition instructions 68, obstruction classification instructions 69 and obstruction response instructions 70. Instructions 60-70 direct processing unit 50 to carry out the example obstruction avoidance method 100 outlined in FIG. 3A.

Figure 3A:
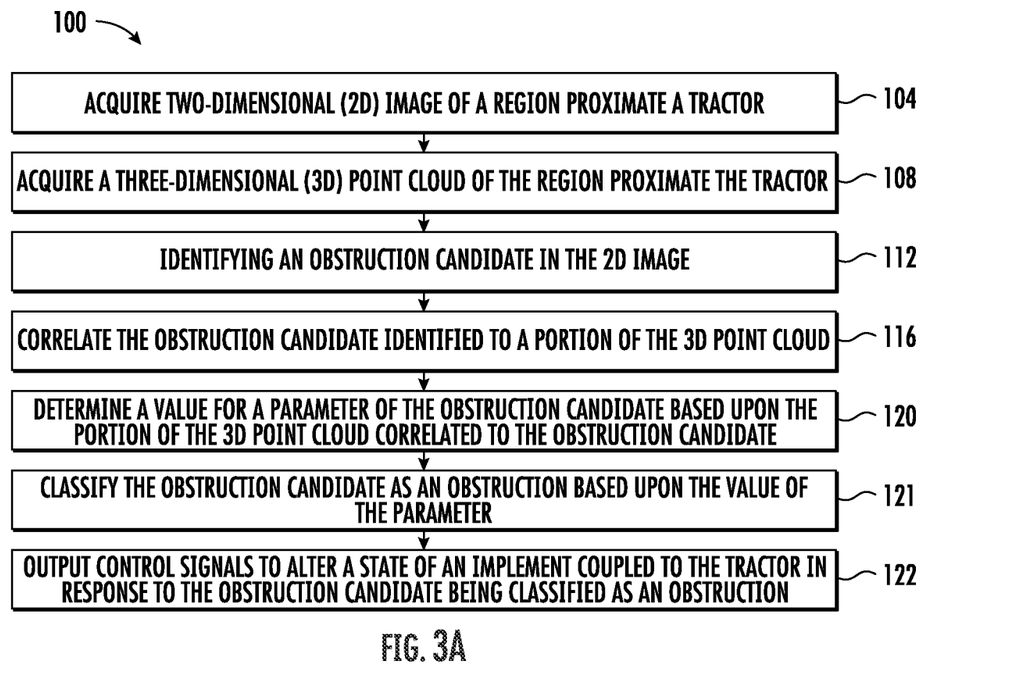
FIG. 3A is a flow diagram of an example obstruction avoidance method.

As indicated by block 104 of method 100 in FIG. 3A, 2D image acquisition instructions 60 direct processing unit 50 to acquire a 2D image of a region proximate to tractor 24. This region may be an area in front of tractor 24 and/or to either side of tractor 24. The region may include an area in the current path of tractor 24 which will pass beneath implement 25 if the current path of tractor 24 is maintained. Instructions 60 direct processing unit 50 to output control signals actuating the at least one sensor 32 so as to output the signals corresponding to the 2D image 42.

Figure 4A:
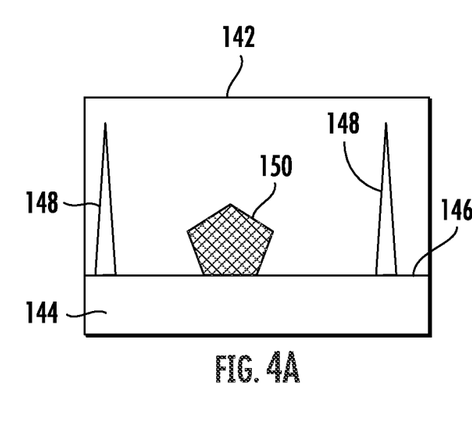
FIG. 4A is a diagram schematically illustrating an example 2D image including an example obstruction.

FIG. 4A illustrates an example 2D image 142 captured by the at least one sensor 32. In the example illustrated, the 2D image 142 comprises a ground surface 144 having a ground plane 146, plants 148 (schematically illustrated) which may be provided in two consecutive rows, and an obstruction 150 resting upon the ground surface 144 between the plants 148.

Figure 4B:
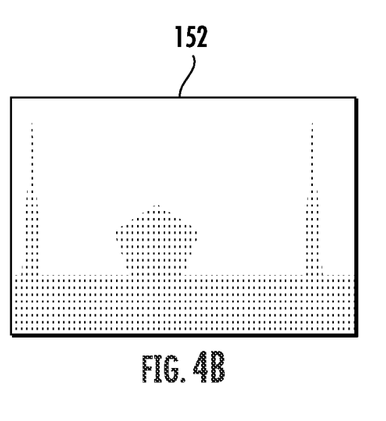
FIG. 4B is a diagram illustrating an example 3D point cloud corresponding to the 2D image of FIG. 4A.

As indicated by block 108 of method 100 in FIG. 3A, 3D point cloud acquisition instructions 60 direct processing unit 50 to acquire a 3D point cloud of the region proximate the tractor, the same region for which a 2D image was rendered and acquired. FIG. 4 illustrates an example 3D point cloud 152 corresponding to the region depicted in 2D image 142. Each individual point in 3D point cloud 152 may have an associated set of Cartesian coordinates. In one implementation, the 3D point cloud is generated from a stereo image captured by a stereo camera and transformed to the 3D point cloud using photogrammetry software.

As indicated by block 112 of method 100 in FIG. 3A, obstruction identification instructions direct processing unit 50 to identify an obstruction candidate in the 2D image. An obstruction candidate may refer to any object not intended to lie within the current path of tractor 24 and implement 25. For example, plants in various crop rose are expected and intended and may not constitute an obstruction candidate. By contrast, rocks, logs or other similar objects may not be intended and may constitute obstructions depending upon their dimensions and/or locations.

In some implementations, a particular obstruction is identified in the 2D image using optical recognition or image in analysis, wherein processing unit 50 analyzes different regions and pixels of the 2D image 142 to identify the outline of different structures. The outline may be compared to a stored library of objects including obstructions, wherein the object or structure in the 2D image is compared against the objects in the store library to determine whether the structure is an obstruction.

Figure 4C:
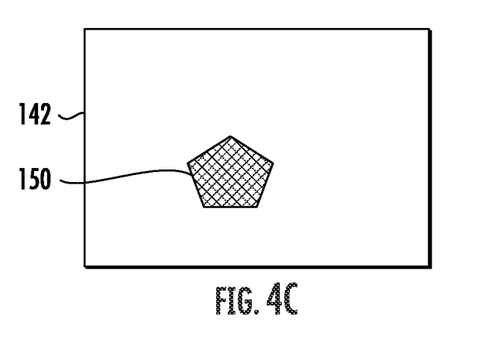
FIG. 4C is a diagram illustrating the example 2D image of FIG. 4A with the identification of the example obstruction.

In some implementations, processing unit 50 and medium 52 may be part of a neural network that is trained to distinguish obstructions from non-obstructions and is configured to identify and obstruction based upon previously stored training images of obstructions. FIG. 4C illustrates the previous two-dimensional image 142 with the identified obstruction candidate 150. It should be noted that the ground surface 144 and the plants 148 are distinguished from obstruction candidate 150 and not identified or classified as obstructions. Although the obstruction candidate is identified in the 2D image, its dimensions and location are not readily available from the 2D image 142.

Figure 4D:
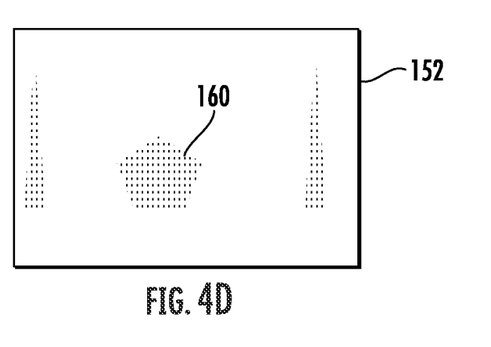
FIG. 4D is a diagram illustrating the example 3D point cloud of FIG. 4B after removal of the ground plane by processing.
Figure 4E:
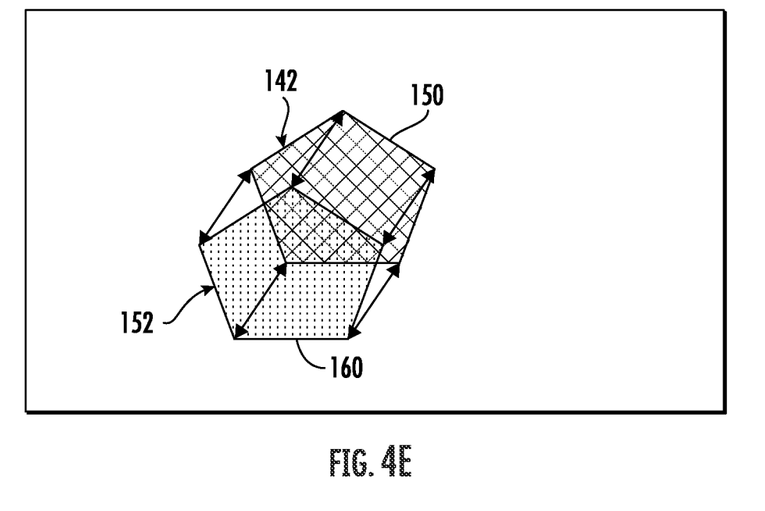
FIG. 4E is a diagram illustrating the example 3D point cloud of FIG. 4D correlated to the example identified obstacle in the 2D image of FIG. 4C.

As indicated by block 116 of method 100 in FIG. 3A, image-cloud correlation instructions 66 direct processing unit 50 to correlate the obstruction candidate identified in block 112 in the 2D image acquired in block 104 to a portion (less than whole) of the 3D point cloud acquired in block 108. As shown by FIG. 4D, in some implementations, to facilitate such correlation, medium 52 may include instructions that further direct processing unit 50 to identify and remove the ground plane 146 of 3D point cloud 152 prior to such correlation. FIG. 4E illustrates correlation of the identified obstruction candidate 150 from the 2D image 142 to a corresponding portion 160 of 3D point cloud 152. In one implementation, the 2D point cloud is digitally overlaid upon the remaining portions of the 3D point cloud. Those portions of the 3D point cloud overlaid by those portions of the 2D image previously identified as an obstruction candidate serve to provide Cartesian coordinates for the identified obstruction candidate. In the example shown in FIG. 4E, overlay of the identified obstruction candidate 150 identifies what individual points in the 3D point cloud correspond to points of the identified obstruction candidate 150.

As indicated by block 120 of method 100 in FIG. 3A, obstruction parameter acquisition instructions 68 direct processing unit 50 to determine parameters, such as a location and dimensions of the identified obstruction candidate. For example, the individual points in the 3D point cloud that corresponded to the identified obstruction candidate as determined in block 116 each have Cartesian coordinates. These Cartesian coordinates may be used to identify the parameters of the identified obstruction candidate. In some implementations, given the predetermined mounting of the at least one sensor 32 and the sensing range or field-of-view of the lease one sensor 32, process may use coordinates of the points cloud corresponding to the identified obstruction in the 2D image to determine the positioning or location of the obstruction relative to tractor 24.

As indicated by block 121 of method 100 in FIG. 3A, classification instructions 69 direct processing unit 50 to determine whether the obstruction candidate 150 is expected to be an actual obstruction to implement 25 based on the values for at least one parameter determined in block 120. The classification of obstruction candidate 150 as an actual obstruction may be based upon the current future path of the implement, characteristics of the implement such as its height above the ground or soil, the location of the obstruction candidate 150 relative to the current future path of the implement and the dimensions of the obstruction candidate 150 relative to characteristics of the implement. For example, in circumstances where an implement floats above the ground, an obstruction candidate 150 may be classified as an actual obstruction if the height of the obstruction candidate is greater than the height at which the implement floats above the ground. In circumstances where an implement engages the ground with ground engaging members at predefined spacings (such as with a plow), and obstruction candidate may be classified as an actual obstruction if a width of the obstruction candidate is greater than the predefined spacings and is in a path of one of the members.

In some implementations, the determination of whether an obstruction candidate constitutes an actual obstruction may utilize both the determined location and at least one dimension of the obstruction candidate determine from the 3D point cloud. In some implementations, the determination of whether an obstruction candidate constitutes an actual obstruction may utilize just a determined location or just at least one dimension of the obstruction candidate. For example, the at least one sensor may have a field-of-view so as to capture data from only those that will necessarily lie within the forthcoming path of the tractor and implement. In such implementations, an obstruction candidate depicted in the 2D image, by default, will be within the forthcoming path of the tractor/implement. In such implementations, the classification of the obstruction candidate as an actual obstruction may depend solely upon its dimensions, such as whether or not the obstruction will have a height that causes the obstruction to be engaged by the implement as implemented moved across the obstruction.

As indicated by block 122 of method 100 in FIG. 3A, obstruction response instructions 70 direct processing unit 50 to determine whether any action, if any, should be made and if so, what action should be made in response to the obstruction candidate being classified as an actual obstruction. In some implementations, the response may be automatic and may be prescribed independent of the particular dimensions and/or locations of the particular obstruction. For example, in response to any obstruction, the implement may be raised to a preestablished height for a predefined period of time before being lowered once again.

In other implementations, the response may vary depending upon the particular dimensions and/or location of the particular obstruction. For example, processing unit 50 may use the determined location of the obstruction to determine whether the obstruction lies in the current trajectory or path of tractor 24 and/or implement 25. In some implementations, implement 25 may have a width greater than the width of tractor 24, wherein the obstruction may be encountered by implement 25 while being avoided by tractor 24. In particular implementations, using the determined location of the obstruction, processing unit 50 may determine what particular portion of tractor 24 and/or implement 25 is expected to encounter the obstruction given the current path or trajectory of tractor 24 and implement 25. Using the determined dimensions of the obstruction, such as its transverse width and height, processing unit 50 may determine whether the obstruction will freely pass beneath the implement or will impact the implement at the current height of the implement.

In some implementations, instructions 70 may direct processing unit 50 to output control signals to an actuator to alter the trajectory or path of tractor 24 and the implement 25 such that the obstruction is completely avoided, such that the obstruction may pass below selected portions of implement 25 having a greater height above the ground surface as compared to other portions of implement 25, or such that obstruction will encounter those portions of the implement 25 that may be less susceptible to damage from an encounter with the obstruction. For example, certain portions of implement 25 may be more resilient to bend without damage, may be more easily repaired or replaced, or may have a lesser impact on the overall operational performance of the implement.

In some implementations, instructions 70 may direct processing unit 50 to output control signals for an actuator to adjust the positioning of implement 25 so as to avoid encountering the obstruction or reduce contact with the obstruction. For example, such control signals may cause an actuator to move the implement transversely or in a sideways direction relative to tractor 24 so as to reduce or avoid contact with the obstruction. Such control signals may cause an actuator to raise implement 25 to reduce or avoid contact with the obstruction. For example, using the determined height of the obstruction, processing unit 50 may output control signals causing an actuator (such as a hydraulic or pneumatic cylinder-piston assembly) on tractor 24 or on implement 25 to raise the lowest most surface of implement 25 to a height greater than the determined height of the obstruction.

Figure 3B:
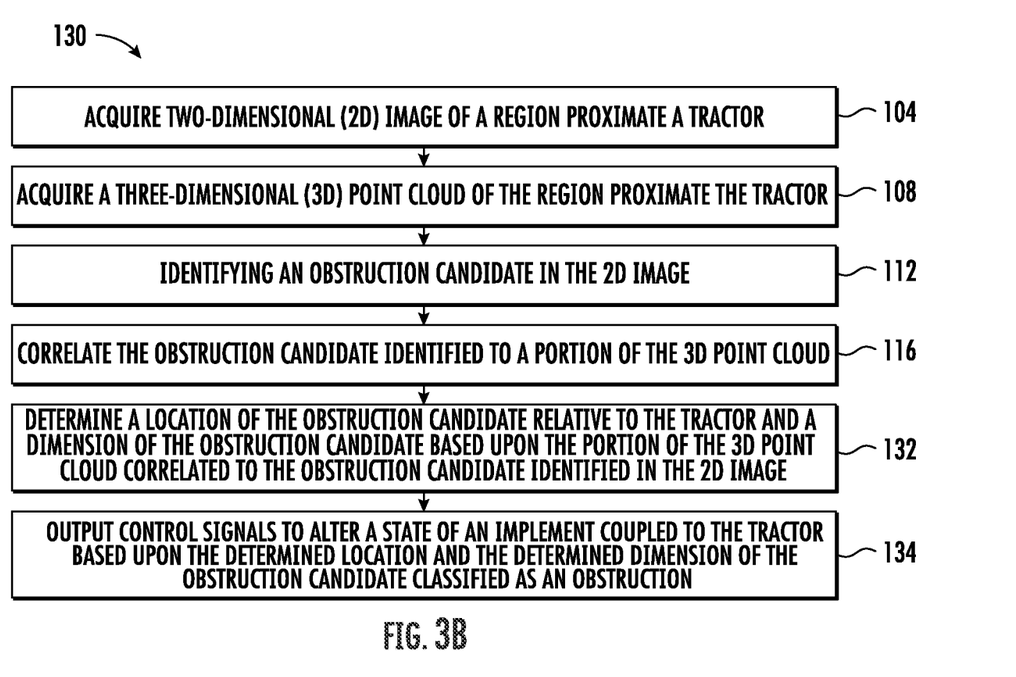
FIG. 3B is a flow diagram of an example obstruction avoidance method.

FIG. 3B illustrates an example obstruction avoidance method 130. Method 130 is similar to method 100 except that method 130 comprises blocks 132 in place of blocks 121 and 122. In block 121, unit 28 determines a location of the obstruction candidate relative to the tractor any dimension of the obstruction candidate based upon the portion of the 3D point cloud correlated to the obstruction candidate identified in the 2D image. In block 134, unit 28 output control signal to alter a state of the implement coupled to the tractor based upon the determine location and the determined dimension of the obstruction candidate classified as the obstruction.

Figure 5:
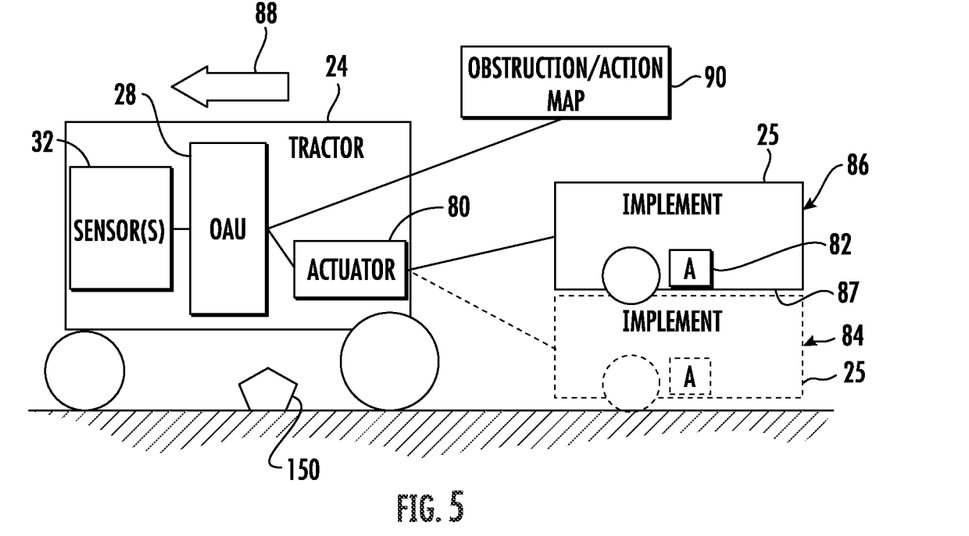
FIG. 5 is a diagram illustrating an example altering of the state of an implement by the example obstruction avoidance system of FIG. 1.

FIG. 5 schematically illustrates one example of obstruction avoidance unit 28 of tractor 24 outputting control signals to an actuator 80 on tractor 20 and/or actuator 82 of implement 25 (both of which are schematically illustrated) to raise implement 25 from the first lower position 84 shown in broken lines to the raised position 86, wherein the lowest most surface 87 of implement 25 is raised to a height above the height of obstruction candidate 150 that is been classified as an actual obstruction 150. As a result, tractor 24 and implement 25, when moving along a path, as indicated by arrow 88, pass over the obstruction 150. In some implementations, actuator 80 may comprise a hydraulic cylinder-piston assembly connected to a three-point hitch or other structure that may pivot or translates so as to raise and lower or transversely move implement 25. Actuator 82 may comprise a hydraulic cylinder-piston assembly having ends operably coupled between a wheel axle and a frame so as to raise and lower the bottom floor of implement 25 relative to the wheel axle. In some implementations, actuator 80 or actuator 82 may comprise a pneumatic pump which may increase the inflation of tires to raise the bottom or floor of the implement 25 to a greater height.

In some implementations, obstruction avoidance unit 28 may further determine when implement 25 will have fully passed over obstruction 150 based upon the location of obstruction 150, the speed of tractor 24 and the dimensions of tractor 24 and implement 25. At such time, processor 50 may output control signals to actuator 80 and/or actuator 82 to return implement 25 to its original height or original transverse position. In some implementations, unit 28 may further help control signals which adjust the operation of implement 25. For example, processing unit 50 may output control signals based upon the determined location and/or height of the obstruction such that rotating or translating parts of the implement may be repositioned, slowed, sped up or stopped.

As further shown by FIG. 5, in some implementations, obstruction avoidance unit 28 may record or store the location at which obstruction 150 was identified and the associated adjustments to the operation of implement 25 based upon the presence of the obstruction 150. The location may be recorded as part of an obstruction/action map 90. The generated map 90 may be subsequently used by a manager to take remedial action such as removing obstruction 150 and/or addressing the prior inaction or altered operations that resulted from the prior presence of obstruction 150 at the determined location. In some implementations, the generated map 90 may be specifically used by tractor 24 other tractors 24 to automatically adjust the positioning or operation of implement 25 or other implement 25 when the tractors and implements once again have a path that intersects the obstruction 150.

Figure 6:
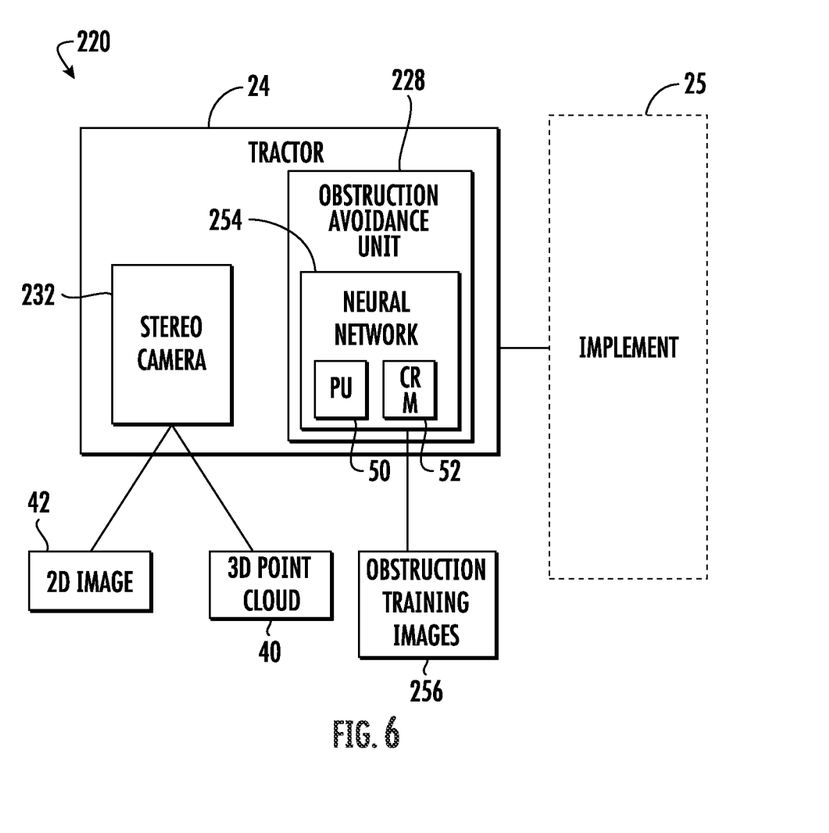
FIG. 6 is a diagram schematically illustrating portions of an example obstruction avoidance system.

FIG. 6 is a diagram schematically illustrating portions of an example obstruction avoidance system 220. FIG. 6 illustrates an example where a stereo camera 232 is used to acquire both 2D images and a 3D point cloud and where the processing unit 50 and the non-transitory computer-readable medium 52 are part of a larger neural network 254 that learns how to identify objects in 2D images based upon a set of human or computer defined obstruction training images 256. Each of the training images may be a 2D image of a defined or known non-obstruction object (plant, weed and the like as described above) and/or a defined or known obstruction candidate (rock or other structure that may cause damage to the implement). In some implementations, a box or window may be drawn by human about the non obstruction object or known obstruction candidate.

Processing unit 50, as part of the neural network 254, may identify common features, factors or criteria with respect to human defined or computer defined object in the training images so as to use the same criteria to identify an obstruction in a sample 2D image. For example, the neural network may identify particular pixel colors, densities, clusters, boundaries, shadings, lighting or the like common amongst human defined or computer defined training portions in the training images and then, through optical analysis, identify those portions of the sample image having the same characteristic pixel colors, densities, clusters, boundaries, shadings, lighting or the like of an obstruction and identify the selected portion of the sample 2D image comprising the predefined non obstruction or predefined obstruction candidate. The remaining components and operations of tractor 24 and implement 25 may be similar to that of system 20. For example, obstruction avoidance unit 228 may be similar to obstruction avoidance unit 28 except that obstruction avoidance unit 228 carries out the identification of the obstruction candidate using a neural network.

Figure 7:
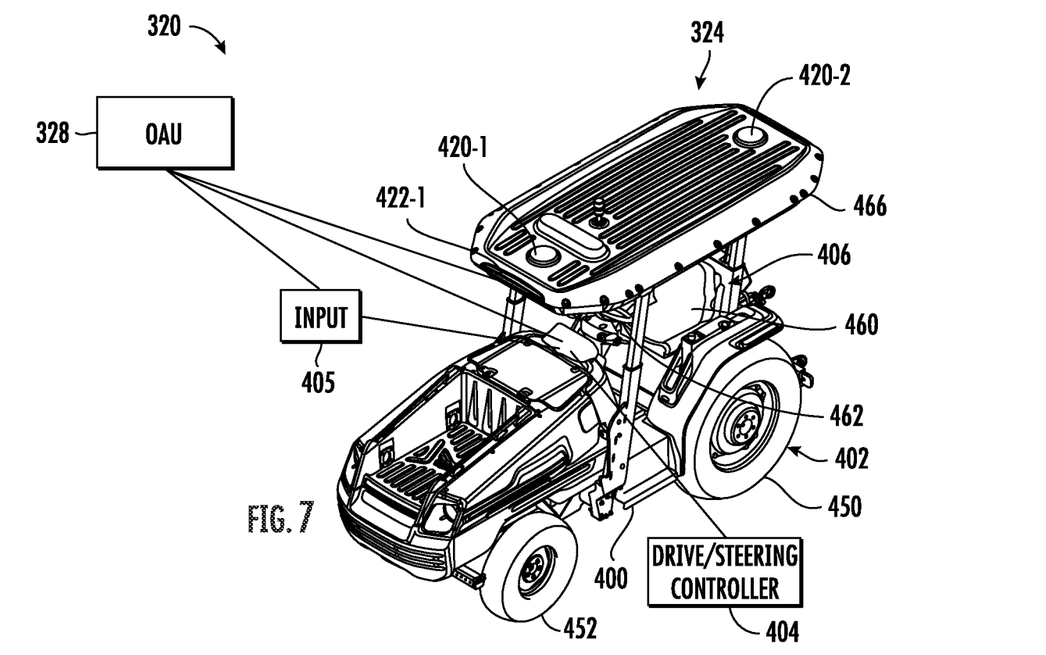
FIG. 7 is a left front perspective view of an example tractor of an example obstruction avoidance system.
Figure 8:
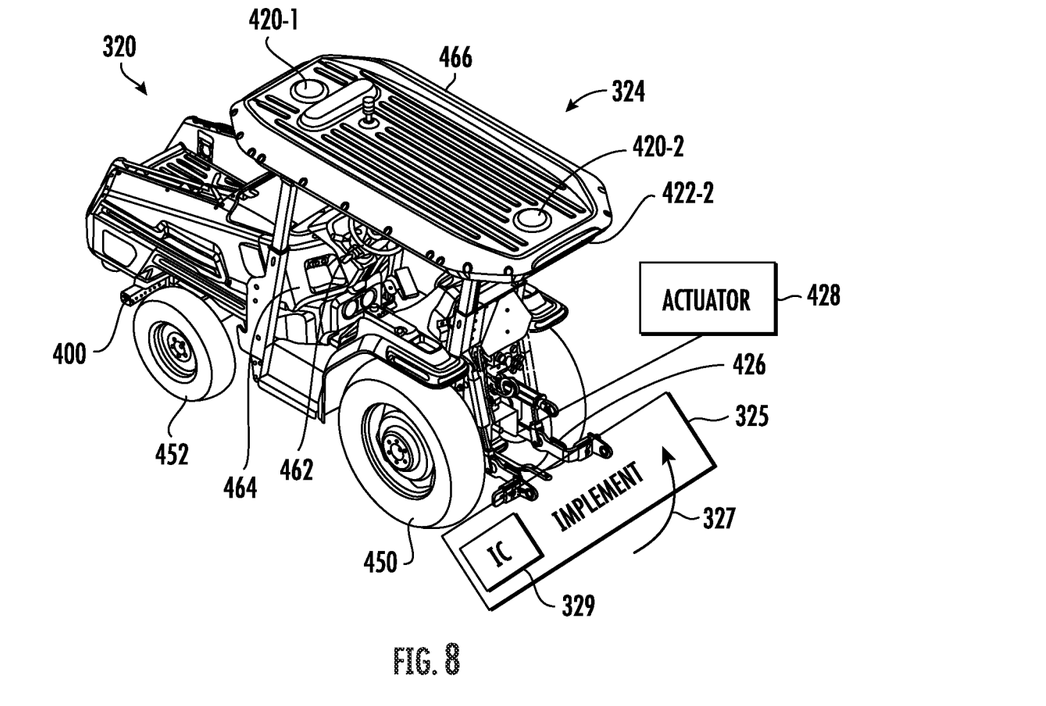
FIG. 8 is a left rear perspective view of the example tractor of FIG. 7 coupled to an example implement (schematically illustrated).

FIGS. 7 and 8 are perspective views of an example obstruction avoidance system 320. FIGS. 7 and 8 illustrate an example of how the schematically illustrated obstruction avoidance system 20 may be embodied in a tractor. Obstruction avoidance system 320 comprises tractor 324 and obstruction avoidance unit 328.

Tractor 324 comprises an agronomy vehicle that may be employed in various settings such as an agricultural setting, a residential setting or a construction setting. Tractor 324 may be used for a variety of purposes in agricultural construction and residential purposes. Tractor 324 may be used to push or pull an implement. Tractor 324 may include attachments, such as a bucket, blade, backhoe, or the like for digging, displacing, and/or carrying various materials such as earthen materials, animal waste and produce. Tractor 324 may include forks or other coupling mechanisms for engaging pallets, bins, boxes, or the like, wherein the tractors carry and/or lift the engaged items.

Tractor 324 comprises chassis 400, ground propulsion members 402, drive/steering controller 404, input 405, agronomy vehicle cab 406, drive/steering controller 416, global positioning system (GPS) units 420-1 and 420-1 (collectively referred to as GPS units 420), stereo cameras 422-1, 422-2 (collectively referred to as cameras 422), three-point hitch 426 and actuator 428.

Ground propulsion members 402 comprise members that engage the underlying terrain and which are driven. In the example illustrated, ground propulsion members 402 comprise rear wheels 450 and front wheels 452. In the example illustrated, rear wheels 450 are driven by an electrical drive while front wheels 452 are manipulated or turned by steering actuator. In other implementations, ground propulsion members 402 may comprise tracks or other ground engaging members.

Drive/steering controller 416 comprises a processing unit and associated non-transitory computer-readable medium containing instructions for directing the processing unit to output control signals for controlling the steering and speed at which tractor 324 moves. Such control signals may be generated in response to a computer program controlling automatic navigation and automated operations of tractor 324. In some implementations, the control signals may direct tractor 324 along a predefined preprogrammed route or path between rows of plants are within a field, orchard or vineyard. In some modes or in some implementations, such control signals may be generated in response to inputs received from an operator remote from tractor 324, not residing in cab 418. In some modes or in some implementations, such control signals may be generated in response to inputs received from an operator providing input which is captured by camera unit 422. In some modes or in some implementations, such control signals may be generated in response to inputs from an operator residing within cab 406.

Cab 406 comprises a compartment in which an operator may be seated when operating tractor 324. Cab 406 comprises a seat 460, a steering wheel 462, a control console 464 and a roof 466. Roof 620 extends over control seat 460 and control console 464. In some implementations, roof 466 may be raised and lowered.

GPS units 420 are supported by roof 466. Each of GPS units 420 comprises a GPS antenna. In the example illustrated, GPS unit 420-1 is located at a front end of roof 466, forward of a rear axle while GPS unit 420-2 is located at a rear end of roof 466, rearward of the rear axle. GPS units 420 receive signals from satellites, from which the geographical location of tractor 324, such as defined by its base link or rear axle center, may be determined. In some implementations, tractor 324 may comprise a single GPS antenna. Signals from the GPS unit 420 may be used to map locations of obstructions.

Cameras 422-1 and 422-2 are supported by roof 466 at a front and a rear of roof 466, facing in forward and rearward directions, respectively. Each of stereo cameras 422 have two or more lenses with a separate image sensor or film frame for each lens. The stereo camera output signals for both the 2D image and the 3D point cloud. In some implementations, the three-dimensional images captured by the stereo camera may be transformed into the 3D point cloud with photogrammetry software. In some implementations, a two-dimensional camera may be used for the 2D image and other sensors, such as a LIDAR sensor may be used for the 3D point cloud. Camera 422-1 captures stereo images in front of tractor 324. Camera 422-2 captures stereo images towards a rear of tractor 324, towards implement 325.

Three-point hitch 426 is located at a rear of tractor 324 and is configured to be coupled to an implement, such as implement 325. Three-point hitch 426 is configured to be pivoted or articulated so as to raise and lower implement 325. Actuator 428 comprises a powered component to move three-point hitch 426 to raise and lower implement 325. In some implementations, actuator 428 may comprise a hydraulic cylinder-piston assembly or an electric solenoid.

Implement 325 comprises a floating implement, an implement that is supported above the underlying ground surface during operation. Implement 325 may be similar to implement 25 described above except that implement 325 is specifically configured to be coupled to tractor 324 by three-point hitch 426. In other implementations, implement 325 may be configured to be connected or attached to tractor 324 in other fashions. In the example illustrated, implement 325 is configured to be pivoted during raising as indicated by arrow 327.

In the example illustrated, implement 325 further comprises an implement component 329 (schematically illustrated). The implement component 329 may comprise a powered mechanism which carries out operations such as a pump for driving fluid such as when implement 325 is a sprayer, a cutting blade which is translated or rotated, a harvesting mechanism or the like. In some implementations, implement component 329 may be actuated between different states and may be turned on, turned off or have its speed adjusted in response to signals from tractor 324 and/or obstruction avoidance unit 328.

Obstruction avoidance unit 328 is similar to obstruction avoidance unit 28 described above. Obstruction avoidance unit 328 comprises processing unit 50 and computer-readable medium 52 described above and is configured to carry out method 100. In the example illustrated, obstruction avoidance unit 328 may store characteristics of implement 325 as well as the characteristics of other implements 325, wherein said stored characteristics may indicate a minimum clearance height for implement 325 above the underlying ground. In some implementations, unit 328 may utilize images of implement 325 captured by camera 422-2 to determine the identity of implement 325, wherein the stored minimum height of implement 325 is retrieved. In some implementations, unit 328 may receive an input for the minimum clearance height of implement 325 through input 405. In some implementations, input 405 may comprise an operator input such as a keyboard, touchpad, button, switch, speech recognition and associate microphone or the like.

In some implementations, instructions 69 may direct processing unit 50 to determine whether the obstruction candidate is an actual obstruction based upon the location and dimensions of the obstruction candidate. 69 may evaluate the current path or future navigation of the tractor 324 and the associated implement to determine whether the location of the obstruction candidate lies within the forthcoming path of the implement. Instruction 69 a further evaluate whether the obstruction candidate has a height or width which will cause the instruction candidate to be contacted by the implement. The obstruction candidate may be classified as an obstruction in response to the obstruction candidate having a determine location the lies within the future path of the implement and the obstruction candidate having a dimension which will result in unintended or potentially damaging engagement with the implement.

In such implementations, instructions 70 may direct processing unit 50 to compare the minimum clearance height for implement 325 to the determined height of an obstruction candidate and/or is location to determine whether it implement 325 should be raised or the extent to which it should be raised. In some implementations, instructions 70 may utilize the determined height of the obstruction and/or its location to determine whether the obstruction candidate is an actual obstruction and to determine whether the operation of implement component 329 should be adjusted (being temporarily paused, sped up, slowed down or otherwise changed). After the obstruction has been passed by implement 325, instructions 70 may direct processing unit 50 to output control signals lowering the implement to its normal operating height.

As with obstruction avoidance unit 28, obstruction avoidance unit 328 may be configured to generate and store an obstruction/action map 90. In such implementations, instructions 70 may direct processing unit 50 to record the geographic location of an obstruction or geographic location at which a state of implement 25 or its component 329 was altered based upon the determined location and dimension of the obstruction. A map 90 may include multiple instances of different obstructions and different actions taken in response to such obstructions.

Figure 9:
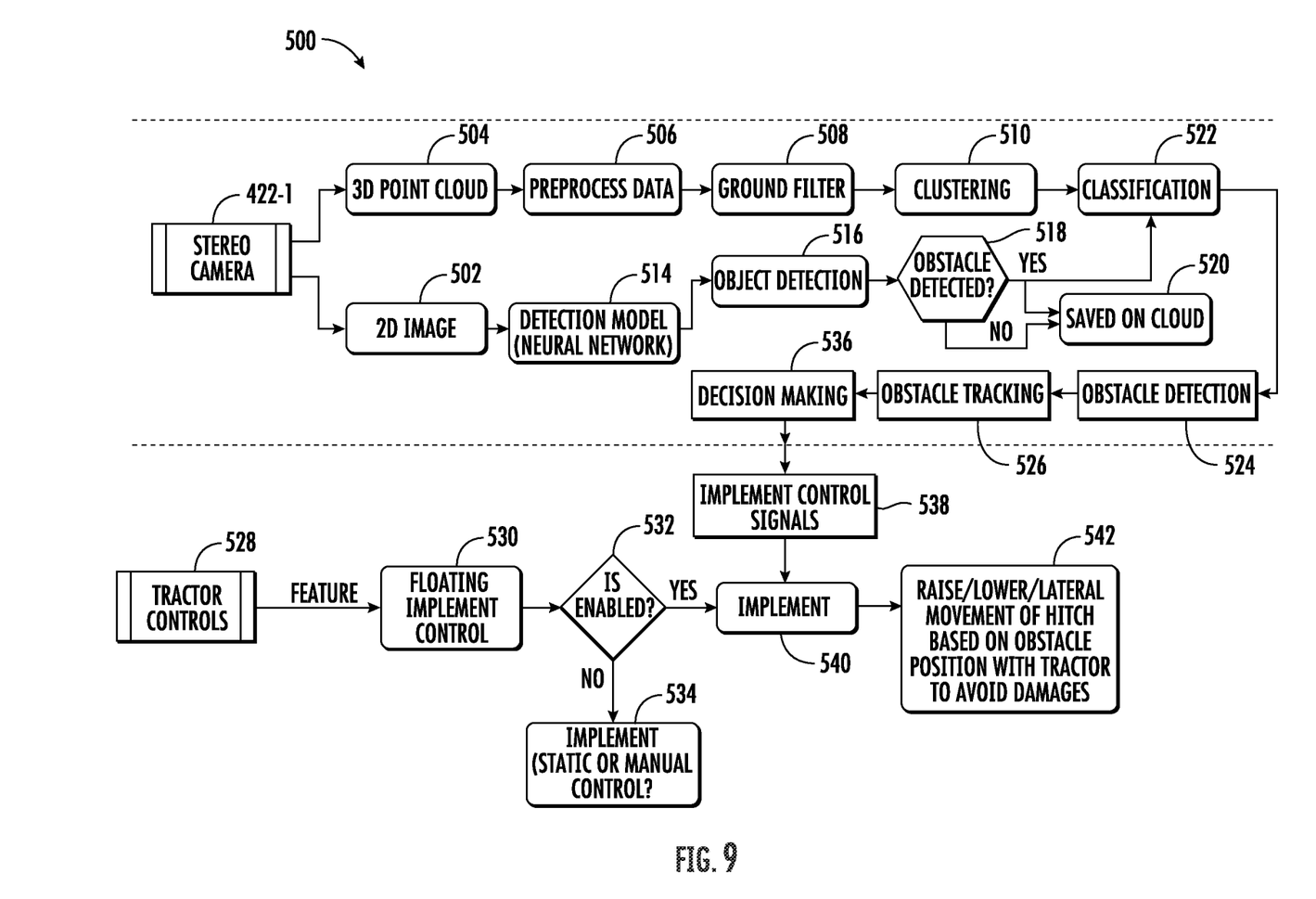
FIG. 9 is a flow diagram of an example obstruction avoidance method.
Figure 10:
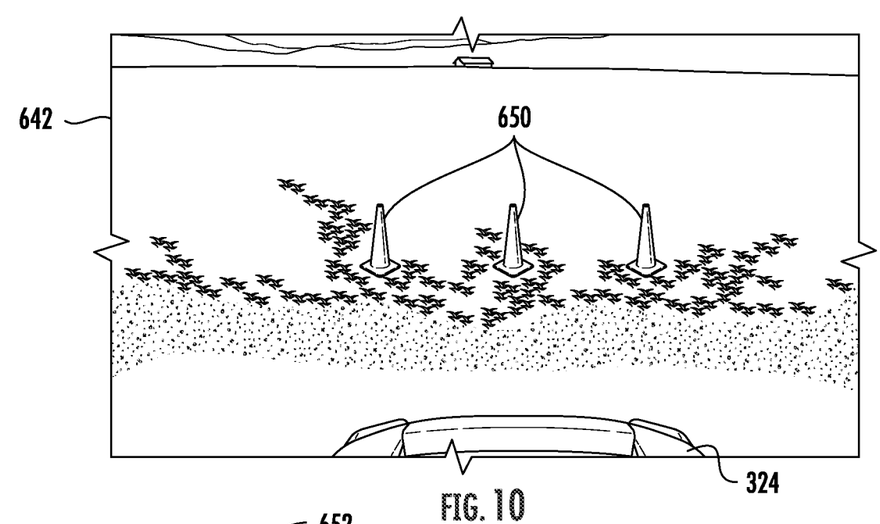
FIG. 10 is a diagram illustrating an example 2D image including example obstructions.

FIG. 9 is a flow diagram of an example obstruction avoidance method 500 that may be carried out by system 320. As indicated by block 502 in FIG. 9, a stereo camera, such as camera 422-1 outputs a 2D image 642. FIG. 10 illustrates an example 2D image 642 which depicts obstructions 650.

As indicated by block 504 in FIG. 9, stereo camera 422-1 further output signals that are utilized to generate a 3D point cloud. As indicated by block 506, data preprocessing operations such as transforming the point cloud to the tractor frame and removing invalid points (within the region of interest) are carried out by obstruction avoidance unit 328.

Figure 11:
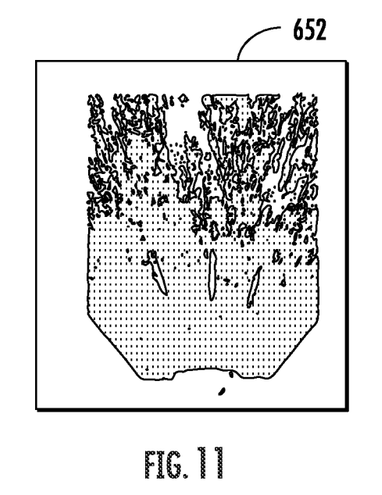
FIG. 11 is a diagram illustrating an example 3D point cloud corresponding to the 2D image of FIG. 10 and taken along a z-axis.
Figure 12:
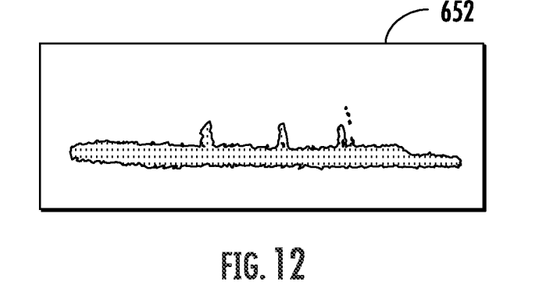
FIG. 12 is a diagram illustrating the example 3D point cloud of FIG. 11 taken along an x-axis.

FIG. 11 illustrates an example 3D point cloud 652 viewed along AZ—at (top-down) corresponding to the 2D image 642 (generated from the same stereo camera 422-1 at the same time as 2D image 642). FIG. 12 illustrates the example 3D point cloud 652 along the x-axis, illustrating how tractor 324 may see obstructions.

Figure 13:
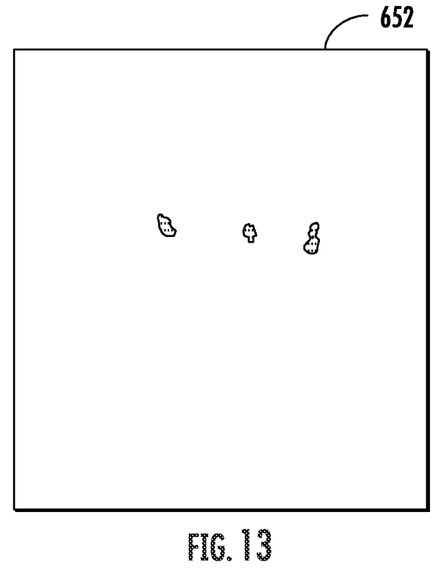
FIG. 13 is a diagram illustrating the example 3D point cloud of FIG. 11 following removal of a ground plane by processing.
Figure 14:
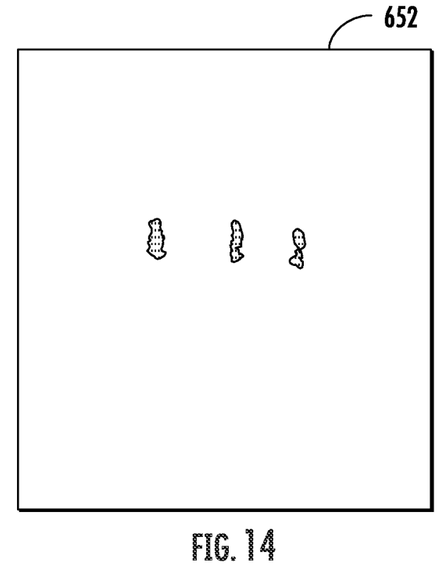
FIG. 14 is a diagram illustrating the example 3D point cloud of FIG. 12 following removal of the ground plane by processing.

As indicated by block 508, unit 328 applies a ground filter algorithm which separates ground and non-ground points and retain non-ground points that represent the object/obstructions. FIG. 13 illustrates the example point cloud 652 along the z-axis following application of the ground filter in block 508. FIG. 14 illustrates the example point cloud 652 along the x-axis following the application of the ground filter in block 508.

As indicated by block 510, unit 328 applies a clustering algorithm to the remaining points in the 3D point cloud to remove any noise and group such points together to represent individual objects.

As indicated by block 514 and block 516, unit 328, part of a neural network, further applies a detection model learned from a 2D training images depicting various obstacles or obstructions. Processing unit 50 and the non-transitory computer-readable medium 52 are part of a larger neural network that learns how to identify obstructions in 2D images based upon a set of human or computer defined obstruction training images 256. Each of the training images may be a 2D image of an object that is predefined as a non-obstruction or an obstruction candidate. In some implementations, a box or window may be drawn by human about the object. Processing unit 50, as part of the neural network 254, may identify common features, factors or criteria with respect to human defined or computer defined object in the training images so as to form the detection model that uses the same criteria to identify an object in a sample 2D image. For example, the neural network may identify particular pixel colors, densities, clusters, boundaries, shadings, lighting or the like common amongst human defined or computer defined training portions in the training images and then, through optical analysis, identify those portions of the sample image having the same characteristic pixel colors, densities, clusters, boundaries, shadings, lighting or the like of an obstruction and identify the selected portion of the sample 2D image comprising the obstruction.

As indicated by block 520, the determination of the presence of an obstruction candidate in the 2D image or a lack of an obstruction candidate in the 2D image is stored on a remote storage or the "cloud". If an object in the 2D image cannot be identified as a non-obstruction or as a known or positive obstruction candidate, the object is identified as and treated as an obstruction candidate along with any other obstruction candidates in the 2D image that have been positively identified as obstruction candidates. In some implementations, the determination may also be stored locally on tractor 324.

Figure 15:
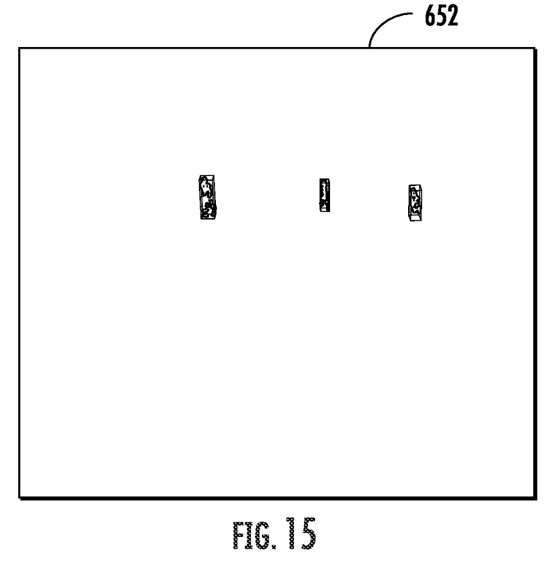
FIG. 15 is a diagram just rating the example point cloud of FIG. 14 correlated to the example obstacles identified in the example 2D image of FIG. 10.

As indicated by block 522, in response to an obstruction candidate being identified in the 2D image 642 in block 514-518, those points in the 3D point cloud are correlated to the obstruction candidate to detect the location of the obstruction candidate as well as its coordinates from the 3D point cloud. FIG. 15 illustrates the detection of the example obstructions in the 3D point cloud 652, as identified in the example 2D image 642. The coordinates of the various points in the 3D point cloud 652 indicate both the geographic location of the identified obstruction as well as its dimensions. As further indicated by block 522, unit 328 classifies the obstruction candidate as an actual obstruction based upon the determined location and dimensions of the obstruction candidate.

As indicated by block 526, unit 328 may use the identified coordinates of the classified obstruction to track the identified obstructions, monitoring the relative position to tractor 324 tractor 324 is moving through the field, or trigger vineyard. For example, unit 328 may, using signals from GPS units 420-1 and/or 420-2, to determine the current location or coordinates of tractor 324. Unit 328 may further utilize such coordinates from the GPS units at different times or utilize signals from wheel encoders indicating the current speed of tractor 324 signals from potentiometer indicating the current steering angle of tractor 324 to determine the current path of tractor 324. As tractor 324 moves along the path, the relative position of the obstruction/obstacle to tractor 324 and an implement, such as implement 325, may change. This change in the relative positioning may be tracked so as to time any adjustments to the state of the implement to reduce or avoid damage to the implement that might be caused by the detected obstruction.

As further illustrated by block 528 in FIG. 9, controller 404 and/or unit 328 may carry out tractor controls and may include an automated floating control feature 530. As indicated by block 532, automatic or automated floating control may be enabled or disabled. In response to the floating implement control being disabled, control over the height or other state of implement 325 may be static or maybe under manual control as indicated by block 534.

As indicated by block 536, the tracked position of the detected object serves as an input for decision-making. In response to the optical being within the predicted path of tractor 324, unit 328 output control signals to drive/steering controller 404 as indicated by block 538. As indicated by block 540, in response to the automatic floating control being enabled and in response to the control signals in block 538, state of implement 540 may be altered based upon the determined location and dimension of the obstruction. As indicated by block 542, one example altering of the state of implement 540 may be raising, lowering or lateral movement of the hitch 426 of tractor 324 based upon the relative position of the obstacle with respect to the tractor 324, implement 325 or their paths. In other implementations, the state of implement 325 or any other implement coupled to tractor 324 may be altered in other fashions.

Although the present disclosure has been described with reference to example implementations, workers skilled in the art will recognize that ratty look alike already a lot that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An obstruction avoidance system comprising:
a tractor for use with an implement, the tractor comprising at least one sensor configured to output signals serving as a basis for a three-dimensional (3D) point cloud and to output signals corresponding to a two-dimensional (2D) image; and
an obstruction avoidance unit comprising:
a processor;
a non-transitory computer-readable medium containing instructions to direct the processor to:
output control signals to the at least one sensor to capture a particular 2D image proximate the tractor;
output control signals to the at least one sensor to output the signals serving as a basis for a particular 3D point cloud;
identify an obstruction candidate in the particular 2d image;
correlate the obstruction candidate in the particular 2D image to a portion of the particular 3D point cloud to determine a location of the obstruction candidate relative to the tractor and to determine a dimension of the obstruction direction;
classify the obstruction candidate as an obstruction based on the location and the dimension; and
output control signals to alter a state of the implement coupled to the tractor in response to the obstruction candidate being classified as the obstruction,
wherein the instructions are to direct the processor to control a duration at which the state of the implement is altered based upon a speed of the tractor, and
wherein the implement comprises tires and a pneumatic pump and wherein the instructions are configured to direct the processor to output control signals to actuate the pneumatic pump to inflate the tires to raise the implement to a height based upon the determined location and dimension of the obstruction.

2. The obstruction avoidance system of claim 1, wherein the at least one sensor comprises a stereo camera configured to output the signals serving as the basis for the three-dimensional (3D) point cloud and to output the signals corresponding to the two-dimensional (2D) image.

3. The obstruction avoidance system of claim 1 further comprising a stored library of objects, wherein the instructions are to direct the processor to identify the obstruction candidate in the 2D image by comparing portions of the 2D image with the objects in the stored library.

4. The obstruction avoidance system of claim 1, wherein the processing unit and the non-transitory computer-readable medium form a neural network that learns how to identify the objects in the 2D image from a training set of images of objects.

5. The obstruction avoidance system of claim 1, wherein the instructions are to direct the processor to remove a ground plane from the 3D point cloud prior to the correlating of the obstruction candidate identified in the 2D image to the portion of the 3D point cloud.

6. The obstruction avoidance system of claim 1, wherein the instructions are to direct the processor to perform clustering on the 3D point cloud.

7. The obstruction avoidance system of claim 1, wherein the control signals are to raise or lower the implement based upon a comparison of a minimum clearance height for the implement and the determined dimension of the obstruction.

8. The obstruction avoidance system of claim 1, wherein the instructions are to direct the processor to capture an image of the implement coupled to the tractor and to identify the implement based upon the image and wherein the instructions are to direct the processor to retrieve a minimum height for the implement from a stored library based upon the identification of the implement from the image.

9. The obstruction avoidance system of claim 1, wherein the instructions are to direct the processor to record a geographic location of the obstruction or a geographic location at which the state of the implement was altered based upon the determined location and dimension of the obstruction.

10. The obstruction avoidance system of claim 1, wherein the instructions are to direct the processor to generate and store a map of obstruction geographic locations based on signals from a global positioning satellite (GPS) unit or geographic location at which the state of the implement was altered based upon the signals from the GPS unit and the determined location and dimension of the obstruction.

11. The obstruction avoidance system of claim 1, wherein the instructions are to direct the processor to output the control signals to alter the state of the implement coupled to the tractor by adjusting an operational state of the implement based upon the determined location and dimension of the obstruction.

12. The obstruction avoidance system of claim 1, wherein the instructions are to direct the processor to output control signals to maintain at least portions of the implement in a raised state based upon the determined location and dimension of the obstruction for a duration based upon the speed of the tractor.

13. The obstruction avoidance system of claim 1, wherein the instructions are configured to direct the processor to (1) make a determination that a first portion of the implement will not pass over the obstruction with a current path of the tractor, and, in response thereto, (2) output control signals to alter the current path of the tractor such that a second portion of the implement, different than the first portion, will pass over the obstruction.

14. The obstruction avoidance system of claim 1, wherein the implement comprises a part that continuously rotates or translates and wherein the instructions are configured to direct the processor to output control signals to adjust the speed at which the part continuously rotates or translates based upon the determined location and dimension of the obstruction.

15. An obstruction avoidance system comprising:
a tractor for use with an implement, the tractor comprising at least one sensor configured to output signals serving as a basis for a three-dimensional (3D) point cloud and to output signals corresponding to a two-dimensional (2D) image; and
an obstruction avoidance unit comprising:
a processor;
a non-transitory computer-readable medium containing instructions to direct the processor to:
output control signals to the at least one sensor to capture a particular 2D image proximate the tractor;
output control signals to the at least one sensor to output the signals serving as a basis for a particular 3D point cloud;
identify an obstruction candidate in the particular 2d image;
correlate the obstruction candidate in the particular 2D image to a portion of the particular 3D point cloud to determine a location of the obstruction candidate relative to the tractor and to determine a dimension of the obstruction direction;

classify the obstruction candidate as an obstruction based on the location and the dimension; and output control signals to alter a state of the implement coupled to the tractor in response to the obstruction candidate being classified as the obstruction, wherein the instructions are configured to direct the processor to (1) make a determination that a first portion of the implement will not pass over the obstruction with a current path of the tractor, and, in response thereto, (2) output control signals to alter the current path of the tractor such that a second portion of the implement, different than the first portion, will pass over the obstruction.

16. The obstruction avoidance system of claim 15, wherein the implement comprises a part that continuously rotates or translates and wherein the instructions are configured to direct the processor to output control signals to adjust the speed at which the part continuously rotates or translates based upon the determined location and dimension of the obstruction.

* * * * *